July 12, 1966 K. V. BOSTWICK 3,260,982
FLAT CABLE STRAIN RELIEF
Filed Dec. 31, 1963 3 Sheets-Sheet 1
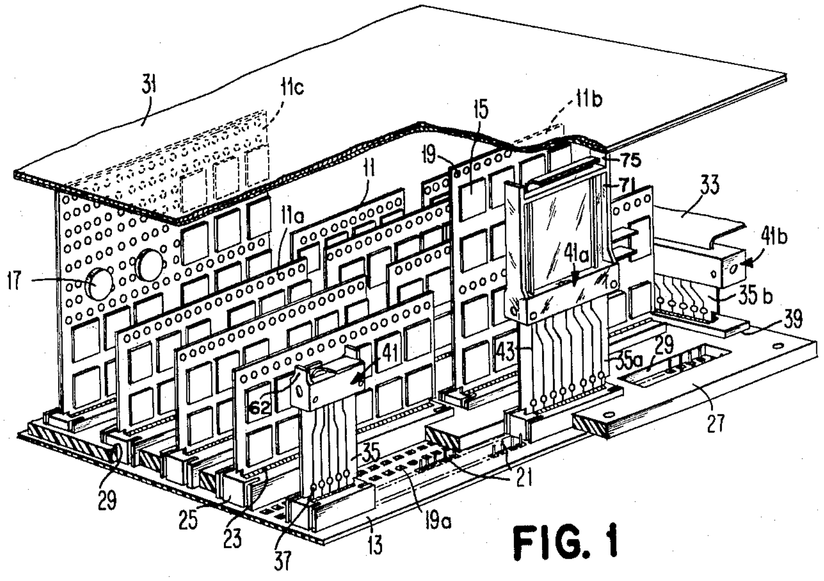
FIG. 1
FIG. 5
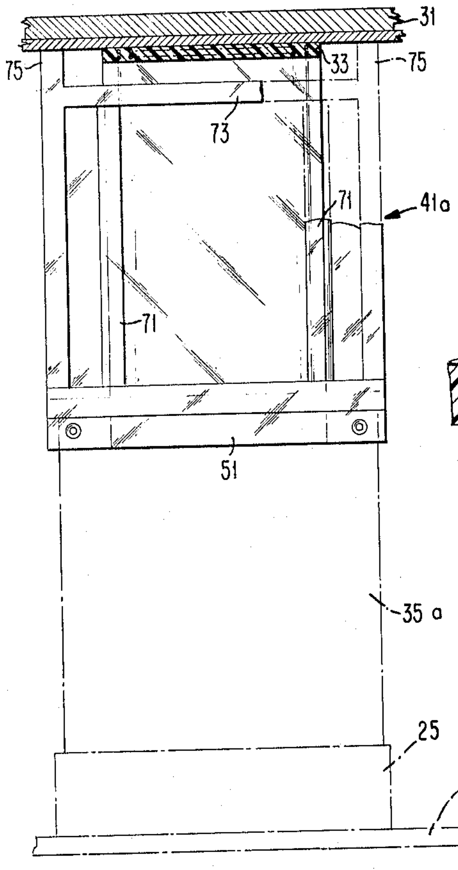
FIG. 2
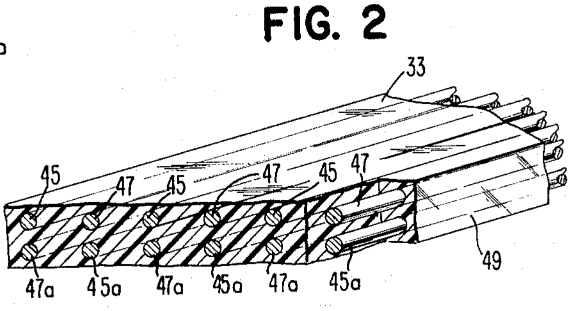
INVENTOR
KENNETH V. BOSTWICK
BY Donald R. Campbell
ATTORNEY July 12, 1966 K. V. BOSTWICK 3,260,982
FLAT CABLE STRAIN RELIEF
Filed Dec. 31, 1963 3 Sheets-Sheet 3
FIG. 6
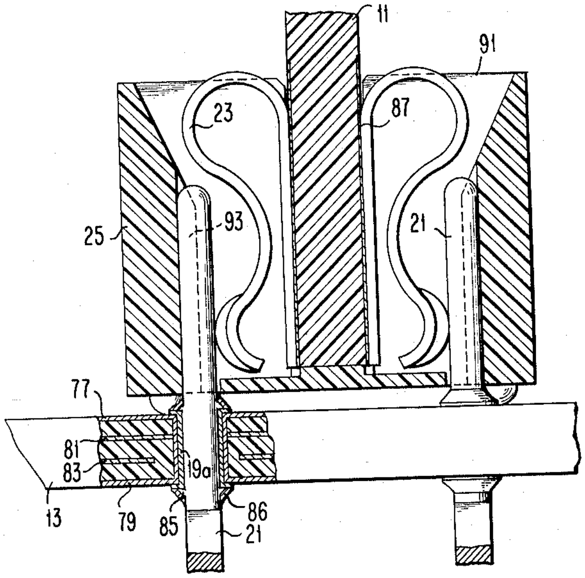
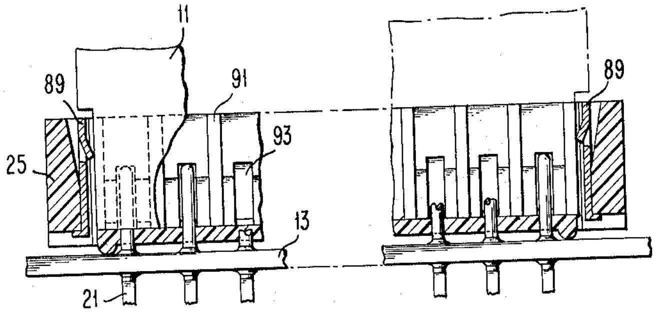
FIG. 7

3,260,982

United States Patent Office

Patented July 12, 1966

1

3,260,982

FLAT CABLE STRAIN RELIEF

Kenneth V. Bostwick, Endwell, N.Y., assignor to International Business Machines Corporation, New York, N.Y., a corporation of New York Filed Dec. 31, 1963, Ser. No. 334,851
6 Claims. (Cl. 339—17)

This invention relates to strain-relief devices for multiconductor flat cable, and more particularly to such devices wherein the flat cable is attached to conductors on a dielectric panel as for example a printed circuit cable card.

An object of the invention is to provide a new and improved strain-relief device for multiconductor flat cable which is electrically connected, as by soldering, to either side of a double-sided or multiplanar printed circuit card, to prevent strains applied to the cable from being transmitted to the electrical connection.

Another object is the provision of a strain-relief device for multiconductor flat cable of the type having at least two superimposed layers of spaced parallel conductors.

A further object is to provide an inexpensive and easily assembled strain-relief for longitudinally split flat cable which is adapted to be attached to the end of a printed circuit card or similar dielectric panel, and which provides strain-relief immediately adjacent the end of the card and can be extended in the plane of the card to meet different height requirements.

The foregoing and other objects, features and advantages of the invention will be apparent from the following more particular description of preferred embodiments of the invention, as illustrated in the accompanying drawings wherein:

FIG. 1 is a perspective view, portions being broken away, showing a high density electronic packaging arrangement including cable cards attached to multiconductor flat cable utilizing strain-relief devices according to the invention;

FIG. 2 is a perspective view of the multiconductor flat cable with portions shown broken away and in cross-section;

FIG. 5 is a front view of a modification of the strain-relief device shown in FIGS. 3 and 4, portions being broken away and the cable card and mounting board being shown in dotted lines;

Figure 3:
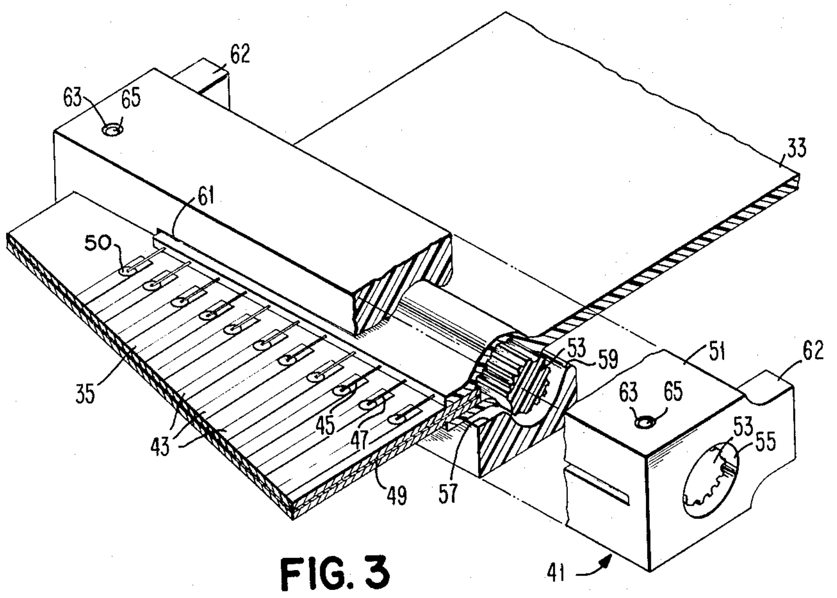
FIG. 3 is a perspective view of the strain-relief device assembled to a cable card, portions being broken away to show interior detail.

FIG. 6 is a partial cross-sectional view, to an enlarged scale, taken crosswise of the connector of FIG. 1 between an assembled small card and large card, wherein the outer planes in the large card are shown full and not etched into circuit patterns; and FIG. 7 is a partial cross-sectional view to a different scale taken longitudinally through the connector shown in FIGS. 1 and 6 between an assembled small card and large card.

The high-density electronic package illustrated in FIG. 1 comprises essentially a plurality of small printed circuit cards 11, **11*a*, 11*b* and 11*c* pluggably mounted approximately at right angles on a large card or printed wiring board 13. The various small cards are similar except for size and are the component-carrying vehicle for miniaturized solid state circuit modules 15 and discrete components 17. Each of the small cards is a double-sided or three-ply copper foil and epoxy glass laminate having a rectangular grid of plated-thru holes 19 in which the module and component leads are inserted and soldered. The internal plane in the three-ply card is either a voltage and ground distribution plane or just a ground plane. The small cards illustrated are in two standard widths and two standard heights. Thus, the cards 11 and 11*b* are single width cards with the single and double heights, respectively, while the cards 11*a* and 11*c*** are the double width cards with single and double heights, respectively. The single and double-width cards can be freely intermixed on a single large card, but usually the different-height cards are not intermixed.

2

The large card 13 (see also FIG. 6) is ordinarily a four-ply copper foil and epoxy glass laminate having external signal planes 77 and 79 and two internal voltage distribution and ground planes 81 and 83. The large card has a rectangular grid of plated-thru holes **19*a* over most of its surface at the same spacing as the plated-thru holes 19 in the small cards, and in the preferred embodiment this is at the intersection of all horizontal and vertical lines spaced .125 inch from one another. Double rows of pins 21 are swaged at 85 and soldered at 86 in selected ones of the plated-thru holes 19*a* in the large card and project from either side by about like amounts. One side of the pins 21 serves as the male connector on which the small cards are plugged, while the other sides are squared up and are available as probe points or to be interconnected by wire-wrapped discrete wiring. On the card side of the board 13**, printed wiring extending largely in the "*x*" direction (not here shown) connects the square land areas of the plated-thru holes **19*a*** in the desired pattern, while on the probe side the printed wiring is largely in the "*y*" direction. The plated-thru holes **19*a* serve as via holes or through connections between the external signal planes and to conduct the supply voltages and ground on the internal planes to the external planes or the pins 21**.

An electrical socket is secured to one end of each of the small cards 11, **11*a*, 11*b* and 11*c* for plugging onto the double rows of pins 21 on the large card 13. The socket includes a double row of inverted U-shaped contact springs 23 soldered to tabs 87 on either side of the small card and a frictionally retained insulating housing 25 for mechanically positioning and preloading the contacts as well as separating them one from another. Card 11 with attached contacts 23 is inserted into housing 25 and frictionally retained on the card by means of tangs on retainers 89 (FIG. 7) in either end wall of the housing which dig in and exert a frictional force when an attempt is made to withdraw the card. Separators 91 extend inwardly from the side walls of the housing 25 for insulating the contacts from one another. Upon plugging the assembled card 11 and housing 25 onto large card 13, pins 21 enter notches 93 in the side walls of the housing and deflect the springs 23 inwardly. A plastic stiffener 27 (FIG. 1) bonded to the card side of the board 13 has parallel columns of rectangular openings 29 for receiving the small card housings 25**. Further information on the packaging arrangement is given in the copending application of A. H. Johnson, W. R. McConnell and P. R. Schulz, Serial No. 298,603, filed July 30, 1963, and assigned to the same assignee as the present invention.

The large card or printed wiring board 13 supporting the single-height small cards 11 and **11*a* or the double-height small cards 11*b* and 11*c* are the basic building block of the packaging arrangement. The large cards 13 are mounted coplanar with one another to a maximum of six across and four down according to the circuit capacity desired. Usually, the large cards 13 are mounted vertically and cooling air is blown upwardly between the columns of small cards. Each plastic stiffener 27 is secured in a rigid frame, and a swinging door 31 preferably is closed against the tops of the small cards to hold them down or assist in holding them down on the large card 13**. Connections between the large cards are made by means of multiconductor flat cable 33 secured to different sizes of cable cards 35, 35*a* and 35*b*, the cable cards being plugged into peripheral positions on the large card 13. The cable cards are preferably a double-sided copper foil and epoxy glass laminate, or are three-ply with an internal ground plane. One or more rows of plated-thru holes 37 make via connections from one side to the other or interconnect with the ground plane. An electrical socket identical to those used for the small cards is secured to one end of each of the cable cards and includes a double row of U-shaped contact springs 23 and a frictionally retained insulating housing 25. The plastic stiffener 27 has additional vertical columns of connected rectangular openings 29 at either side for receiving the housing 25 when the cable cards are plugged onto the pins 21 of the large card. There are additional rows of four separated rectangular openings 39 at the top and bottom of the plastic stiffener 27 for receiving the cable cards 35*b* which make connections between vertically adjacent large cards or printed wiring boards 13.

The cable cards 35, 35*a* and 35*b* as illustrated are in three standard sizes. The cable cards 35 and 35*a* for plugging into the side columns of openings in the plastic stiffener 27 are the same height, but the card 35*a* is a single-width card while the card 35 is a one-half single-width card. The card 35*a* is the same width as the small cards 11 and 11*b*. The cable card 35*b* used in the cable connector making connections between vertically adjacent cards is relatively short so as not to impede air blowing upwardly between the columns of small cards and side cable connectors. The card 35*b* is a single-width card but is one-half or less the height of the other cable cards 35 and 35*a*.

Similar strain-relief devices 41, 41*a* and 41*b* are attached to the respective cable cards 35, 35*a* and 35*b* at the ends of the cards to prevent strains to the multiconductor flat cable 33 from being transmitted to the electrical connection between the conductors of the flat cable and the printed circuit lines 43 on either side of the cards. The strain relief 41 is used in an assembly with the single height small cards 11 and 11*a*, while the strain relief 41*a* is used with the double-height small cards 11*b* and 11*c*. The strain relief 41*b* is used with both heights of small cards. It will be noted that the flat cable 33 used with the half-width cable card 35 is about one-half the width of the flat cable used with the other cards.

Before proceeding to a discussion of the construction of the strain-relief devices, the multiconductor flat cable 33 will be described (see FIG. 2). The flat cable 33 comprises a row of parallel wire conductors 45, 47 superimposed but spaced above a similar row of parallel conductors 45*a*, 47*a*, the two rows being imbedded or encased in an insulating plastic material 49. Where the flat cable is to be used with high and medium-speed circuit families (about five nanoseconds and 30 nanoseconds), the cable 33 is a shielded type wherein the conductors 45, 45*a* are at ground while the other conductors 47, 47*a* are signal conductors. For use with lower-speed circuit families (about 700 nanoseconds), the cable 33 can be an unshielded type wherein more of the conductors can be signal conductors. To illustrate sample dimensions, the wires can be #33 A.W.G., the single-width cable is 1.15 inches wide and the thickness is about .026 inch. For further information, see the copending application of R. C. Paulsen, Serial No. 242,542 filed December 5, 1962, now Patent No. 3,179,904, granted April 20, 1965, and assigned to the same assignee as the present invention.

Figure 4:
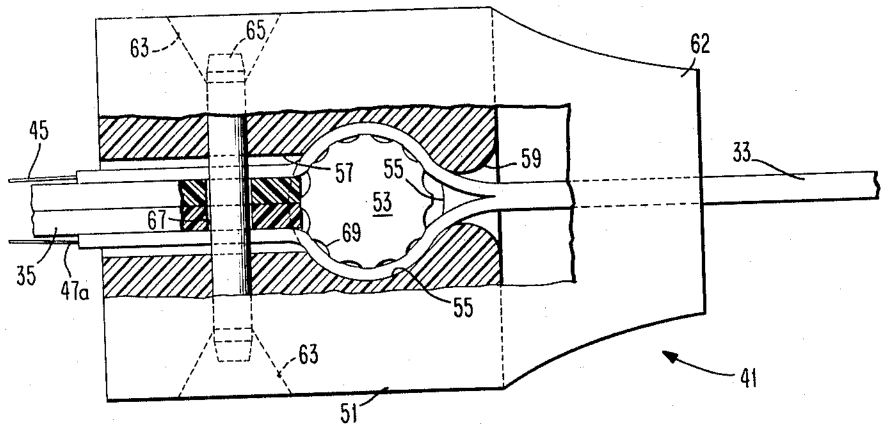
FIG. 4 is an end view of the assembly of FIG. 3 with portions being broken away to show interior details.

Referring to FIGS. 3 and 4, the cable card 35 illustrated is the type having an internal ground plane 49 which makes connection with one or more of the plated-thru holes 37 by failing to have a negative annular land area at the desired point or points, i.e., the ground plane extends to the plated hole. The printed circuit lines 43 terminate at the top of the card in a series of parallel lines corresponding in general with the number of wires 45, 47 in one layer of the double-layered flat cable 33. To attach the cable to the card, the end of the cable is split longitudinally between the two layers of conductors and the insulation at the end of the cable is removed to expose the ends of the conductors. The card 35 is inserted between the split cable ends, and the wires 45, 47 are electrically connected as by soldering at 50 to the printed circuit lines 43 on one side of the card while the wires 45*a*, 47*a* of the other layer are connected to the printed circuit lines on the other side of the card.

The strain-relief device 41 according to the invention comprises two parts, a block 51 and a fluted or serrated rod 53, preferably made of formed plastic. The block 51 is an elongated block having a rectangular cross-section and a cylindrical or tube-like opening 55 running throughout its entire length from one end to the other. Connecting transversely with this cylindrical opening, arranged symmetrically to either side of a diammetrical line through the opening, are a card throat 57 and a cable throat 59. The card throat 57 is an elongated slot having a widened central portion 61 for receiving the thickness of the card 35 and attached split cable 33, the ends of the slot being reduced in width so as to be only wide enough to receive slidably the cable card 35. The cable throat 59 opens at the top of the block 51 and in its preferred form comprises two opposing arcuate surfaces blending smoothly into the cylindrical opening 55 to permit the cable to be bent over at right angles to the card without undue stress as better shown in FIG. 1.

At either end of the top of the block 51 are upstanding ears or rails 62. These allow space in which the cable can be bent over, and build up the total height of the card and strain relief to that of the single-height small cards so that the door 31 bears down on the cable connectors as well as the small cards (assuming that in FIG. 1 only single height small cards 11 and 11*a* are mounted on the large card 13). Near the ends of the block 51 are two transverse pin holes 63 preferably having countersunk ends. Anchor pins 65 are inserted down through the pin holes 63 through corresponding apertures 67 in the cable card 35 to secure the block 51 to the card 35. In the usual mode of assembly, the longitudinally split flat cable 33 with the bared wires projecting from one end is inserted through the block 51 and slid back up the cable for a short distance. The cable conductors are then soldered to the printed circuit lines 43 on either side of the cable card 35. The block 51 is next slid back down the cable 33 and over the end of the cable card 35 until the apertures 67 register with the pin holes 63. The anchor pins 65 can then be inserted with a press fit.

The serrated rod 53 is an elongated cylindrical rod having a length slightly less than the block 51. The rod may possibly have other cross-sectional shapes generally corresponding to that of the opening 55. The entire periphery of the rod 53 is provided with spaced longitudinal flutings 69. The flutings 69 conveniently are arcuate in cross section and create sharp corners at their intersection with the unfluted portions of the circumference of the rod. Having attached the block 51 to the cable card 35 as described, the cable 33 is moved into the block 51 enough to separate the two split layers to create a shed. The serrated rod 53 is then inserted through one end of the cylindrical opening 55 into the shed and pressed through until the end of the rod clears the end of the block 51. One end of the rod 53 is desirably beveled to facilitate assembly. The diameter of the serrated rod is such that the surfaces between the flutings 69 press into the two layers of the cable 33 in the two opposing arcuate areas of the opening 55 between the card throat 57 and the cable throat 59. Desirably the dimensions are such that the serrated rod 53 rests on the end of the cable card 35. Thus the separated layers of the double-layered flat cable 33 are effectively clamped between the rod 53 and the block 51 immediately adjacent the end of the cable card.

The modified form of strain relief 41*a* shown in FIG. 5 is built up in a vertical direction so that the same-height cable card as is used in the embodiment of FIGS. 3 and 4 can be used in an arrangement in which the large card 13 supports the double height small cards 11*b* and 11*c*. In this modification, the two ears 62 take the form of parallel side rails 71. The rails 71 have opposing grooves for receiving the edges of the flat cable 33, which passes through a slot in an upper cross bar 73 and can be bent over approximately at right angles. Above the cross bar 73 are two projecting ears 75 for engaging the closed door 31. The built-up strain relief 41*a* has the advantage that it channels the flow of air in the double-height small card arrangement.

The strain-relief device 41B is still a third modification of the strain relief and is similar to the device 41 except that the ears 62 are eliminated as it is desired to keep the total height of the cable card 35*b* and the strain relief 41*b* at a minimum to minimize impedance to the flow of air upwardly between the columns of small cards.

While the invention has been particularly shown and described with reference to preferred embodiments thereof, it will be understood by those skilled in the art that various changes in form and details may be made therein without departing from the spirit and scope of the invention.

What is claimed is:

1. A strain relief device for multiconductor flat cable having at least two spaced rows of parallel conductors,
the end of said flat cable being split longitudinally between two of the rows of conductors into two separate layers,
bared conductor ends projecting therefrom being adapted to be electrically connected to adhered conductors on either side of a dielectric card inserted therebetween,
said strain relief comprising an elongated block and a serrated rod having peripherally spaced flutings,
means defining in said block a tube-like opening extending to at least one end of the block,
and means defining transverse card and cable throats in said block each intersecting said opening,
said card being adapted to extend into said card throat while the split end of said flat cable extends across the opening and through said cable throat,
said rod being inserted longitudinally into said opening between the split layers of said flat cable to clamp the flat cable between the rod and the block.

2. A strain relief device for double-layered multi-conductor flat cable having two spaced rows of parallel conductors,
the end of said flat cable being split longitudinally between the two rows into separate layers,
bared conductor ends projecting therefrom being adapted to be electrically connected to adhered conductors on either side of a dielectric card inserted therebetween,
said strain relief comprising an elongated block and a rod having peripherally spaced flutings throughout its length,
means defining in said block a cylindrical opening extending from one end to the other,
and aligned card and cable throats intersecting diametrically opposed portions of said cylindrical opening,
said card being adapted to extend into said card throat while the split end of said flat cable extends across the cylindrical opening and through said cable throat,
said rod being inserted longitudinally into said cylindrical opening between the split layers of said flat cable so that the surface of said rod between the flutings presses into the layers to clamp the flat cable between the rod and the block.

3. A construction as defined in claim 1 wherein said block has a pair of ears extending parallel to the edges of said flat cable,
said pair of ears being adapted to be made in different lengths to meet various height requirements.

4. The combination of a strain relief device and a dielectric card to which is electrically connected multiconductor flat cable,
said multiconductor flat cable having at least two spaced rows of conductors, the end of the flat cable being split longitudinally between two of the rows of conductors to provide two separate layers,
the dielectric card being inserted between the layers and adhered conductors on either side thereof being electrically connected to conductors of said flat cable,
said strain relief device comprising an elongated block and a serrated rod having peripheral flutings,
means defining in said block a tube-like opening extending to at least one end of the block,
means defining transverse card and cable throats in said block each intersecting said opening,
said card and attached flat cable extending into said card throat while the split end of the cable projects across the opening and through said cable throat,
and means for securing the block to an end of the dielectric card,
said rod being inserted longitudinally into said opening between the split layers of the flat cable to clamp the flat cable between the rod and the block.

5. The combination of a strain relief device and a dielectric card to which is electrically connected multiconductor flat cable,
said multiconductor flat cable being double-layered with two spaced rows of conductors and having an end which is split longitudinally between the two rows of conductors to provide separate layers,
the dielectric card being inserted between the layers and the conductor ends of said flat cable being attached to adhered conductors on either side of said card,
said strain relief device comprising an elongated block and a longitudinally fluted circular rod,
means defining in said block a cylindrical opening extending to at least one end of the block,
means defining aligned card and cable throats in said block each intersecting diametrically opposite portions of said opening,
said card and attached flat cable extending into said card throat while the split end of the cable projects across the opening and through said cable throat,
and means for securing the block to an end of the dielectric card,
said fluted rod being pressed longitudinally through said opening between the split layers of said flat cable adjacent the end of the dielectric card to clamp the flat cable between the rod and the block.

6. The construction as defined in claim 5 wherein
said block has a pair of ears at the ends thereof extending parallel to the edges of the flat cable,
said pair of ears being adapted to be made in different lengths to meet various height requirements.

References Cited by the Examiner

UNITED STATES PATENTS

| | | | |
|---|---|---|---|
| 2,854,502 | 9/1958 | Richter | 339—105 X |
| 3,004,237 | 10/1961 | Cole et al. | 339—17 X |
| 3,017,602 | 1/1962 | Little | 339—17 X |
| 3,089,114 | 5/1963 | Cole et al. | 339—105 X |
| 3,103,399 | 9/1963 | Martin | 339—105 X |

FOREIGN PATENTS

| | | |
|---|---|---|
| 769,973 | 6/1934 | France. |
| 825,566 | 12/1951 | Germany. |

PATRICK A. CLIFFORD, *Primary Examiner.*

ALFRED S. TRASK, *Examiner.*